A. CLOSZ.
WHEEL STRUCTURE.
APPLICATION FILED AUG. 2, 1920.
1,368,899.
Patented Feb. 15, 1921.
3 SHEETS—SHEET 1.
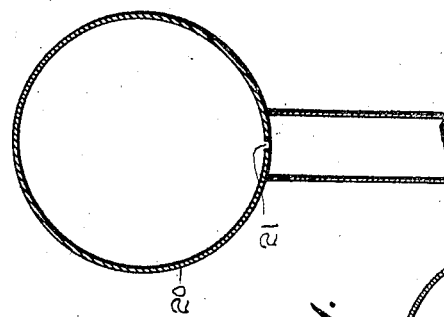
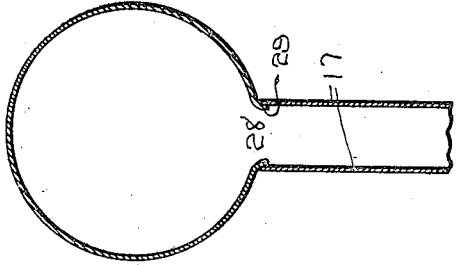
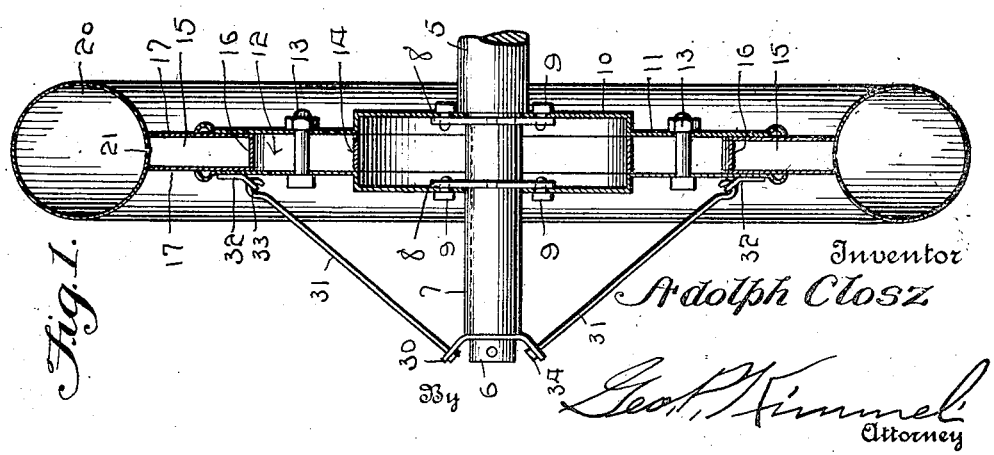
Inventor
Adolph Closz
By Geo. P. Kimmel
Attorney

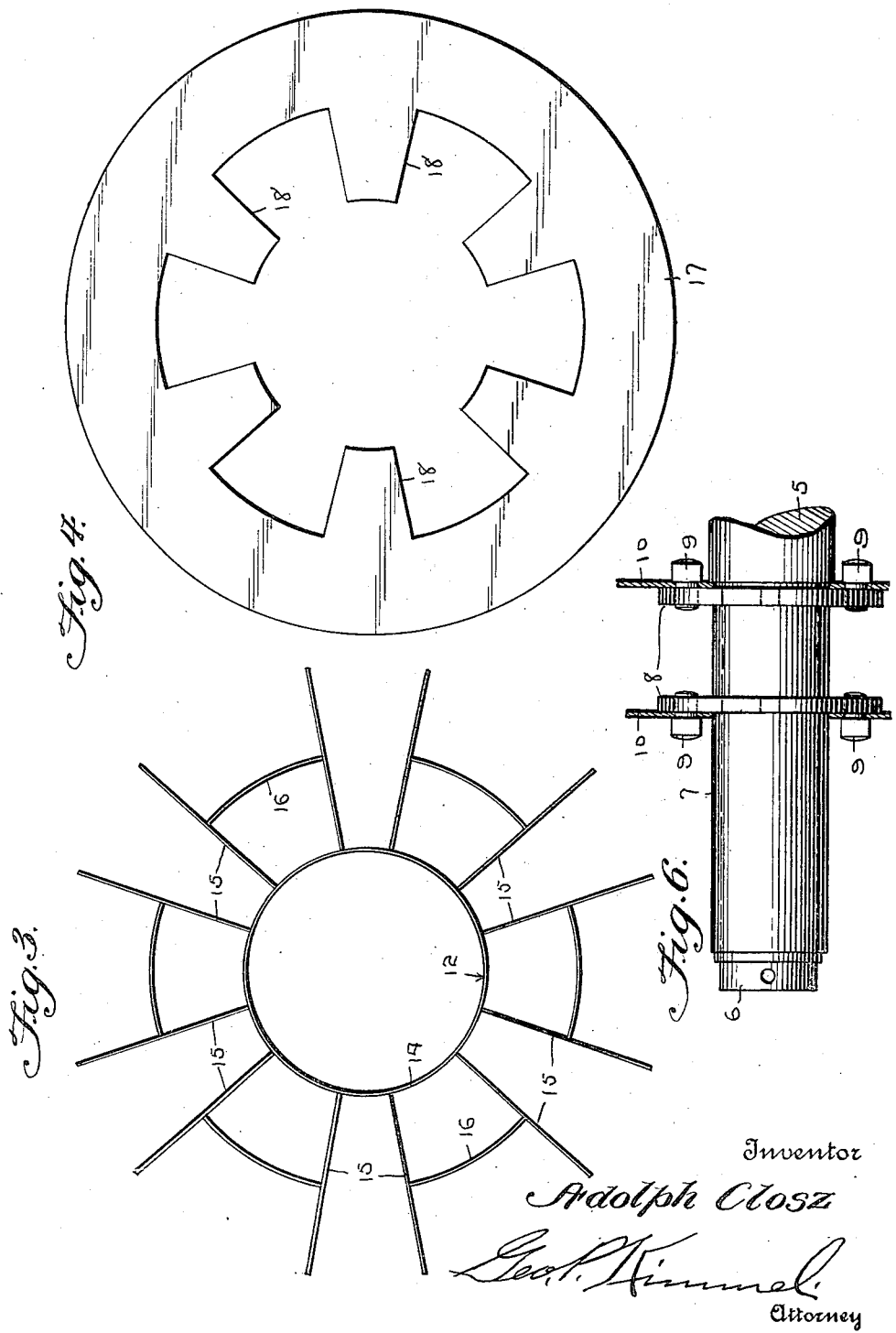

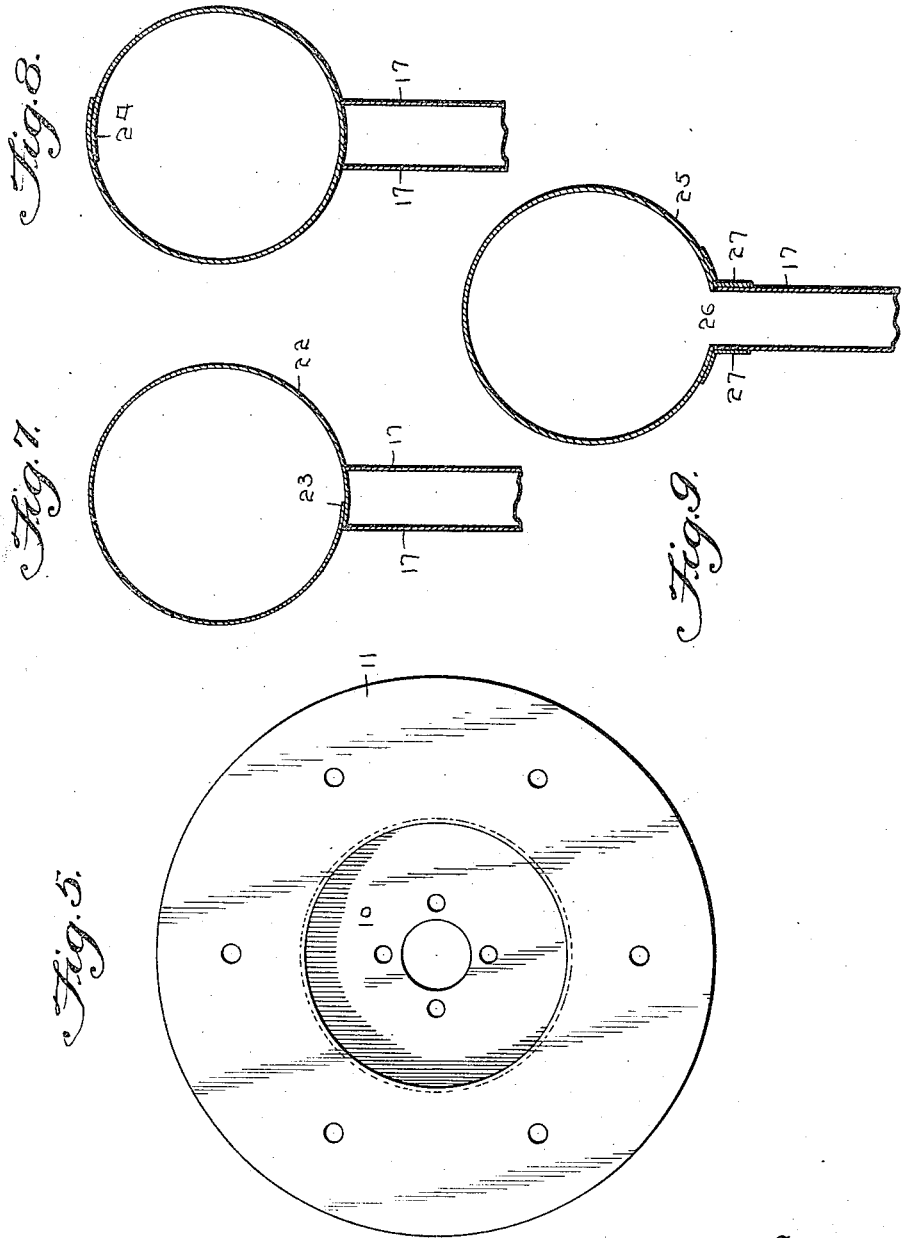

UNITED STATES PATENT OFFICE.

ADOLPH CLOSZ, OF WEBSTER CITY, IOWA.

WHEEL STRUCTURE.

1,368,899.   Specification of Letters Patent.   Patented Feb. 15, 1921.

Application filed August 2, 1920. Serial No. 400,641.

*To all whom it may concern:*

Be it known that I, ADOLPH CLOSZ, a citizen of the United States, residing at Webster City, in the county of Hamilton and State of Iowa, have invented certain new and useful Improvements in Wheel Structures, of which the following is a specification.

This invention has for its object to provide an improved wheel structure constructed throughout of sheet metal and possessing such high degree of strength, durability and lightness as to particularly adapt it for use in connection with the landing gear of aeroplanes, although the invention is not necessarily limited to such use and may be advantageously adapted to motor vehicles and similar machines necessitating the use of resilient tires.

A further object is the provision of a wheel structure of this character wherein the majority of the parts are stamped from sheet metal and consequently inexpensive to manufacture and which is equipped with an improved type of tread member or tire possessing a high degree of resiliency.

With these and other objects in view, the invention consists in certain novel features of construction as hereinafter shown and described and then specifically pointed out in the claims and in the drawings illustrative of the preferred embodiment of the invention.

Figure 1 represents a vertical sectional view through the improved wheel structure, complete.

Fig. 2 represents an enlarged sectional view through the hub plates, tire supporting members and spacing frame detached and separated.

Fig. 3 represents a side view of the spacing frame.

Fig. 4 is a side elevation of one of the tire supporting plates.

Fig. 5 represents a view in elevation of the inside of one of the hub plates.

Fig. 6 represents a fragmental enlarged sectional view of the hub portion of the wheel.

Figs. 7 to 11 represent enlarged detail sectional views of various types of resilient tires designed for use in connection with the improved wheel.

Referring to the drawings in detail, wherein similar reference numerals designate corresponding parts throughout the several views, the numeral 5 indicates an axle provided with a reduced spindle end 6 on which the tubular hub 7 of the wheel is mounted. The inner portion of the hub is provided with spaced integral flanges 8 riveted or otherwise rigidly secured at 9 to the oppositely depressed medial portions 10 of opposed hub plates the outer annular portions 11 of which are extended outwardly in spaced parallel relation.

A spacing frame designated generally by the numeral 12 is interposed between the outer portions 11 of the hub plates and is securely clamped in position between said plates by bolts 13. The frame structure 12 consists of an inner ring 14 having a diameter substantially equal to the depressed central portions 10 of the hub plates and welded or otherwise rigidly connected with a series of radiating plates or spokes 15 which latter are arranged in relatively closely related pairs, as suggested in Fig. 3. Curved braces 16 extending concentrically with the inner ring 12 are welded or otherwise rigidly secured to the adjacent spokes 15 of the several pairs and are designed to increase the strength and rigidity of the frame structure.

A circular tire supporting plate 17 is partially received between each hub plate and the frame structure 12 and said tire supporting plates are cut out along their inner edges to accommodate the radial plates or spokes 15, whereby a non-rotatable connection is established between the tire supporting plates and the frame structure 12. The circular edges of the hub plates are formed with concentric depressions forming internal grooves adapted to receive a suitable packing material whereby admission of dust and dirt to the interior of the wheel structure is prevented.

A resilient metal tire, 20 is welded or otherwise rigidly secured to the outer edges of the tire supporting plates 17.

In the types of tires illustrated in Figs. 1 and 10, they are circular in cross section and formed with an internal slot 21 designed to enhance the resiliency of the tire when applying it to use.

In the modified type of tire structure illustrated in Fig. 7, the tire 22 is also formed of sheet metal the edges of which are overlapped as indicated at 23 at a point intermediate the supporting plates 17. As will be understood, the overlapped edges are capable of relative movement to afford the desired degree of resiliency. The modification illustrated in Fig. 8 is similar to that disclosed in Fig. 7 with the exception that the overlap 24 is disposed upon the outer or tread portion of the tire.

In Fig. 9 the tire 25 is formed with a relatively large slot 26 the edges of which are rigidly attached to the tire supporting plates 17 by angular attaching members 27.

In Fig. 11 the tire is formed with a relatively large slot 28, as in the type disclosed in Fig. 9 while the edges 29 of the slot are turned inwardly and rigidly connected with the outer edges of the tire supporting plates 17.

An angular bracket plate 30 is rigidly fastened to the outer terminal of the tubular hub body 7 and is connected by divergent brace rods 31 with angular bracket plates 32 secured to the outer hub plate 10 at diametrically opposed points thereof. The inner terminals of the brace rods are preferably hooked as at 33 for convenience in engaging them in the opposite angular extremities of the plates 32 whereas nuts 34 are fitted upon the opposite extremities of the rods whereby the latter may be properly tightened to secure maximum rigidity of the wheel structure.

What I claim is:

1. A wheel structure comprising a hub, hub plates connected therewith and disposed in spaced relation, a spacing frame interposed between the hub plates, a tire, and tire supporting plates interposed between the hub plates and spacing frame, said spacing frame extending outwardly to the outer edges of the supporting plates to maintain the latter in spaced relation.

2. A wheel structure comprising a hub, hub plates mounted thereon, a spacing frame maintaining the hub plates in spaced relation, a tire, and tire supporting members interposed between the hub plates and the spacing frame and having portions interfitting with the latter to prevent relative rotation.

3. A wheel structure comprising a hub, spaced hub plates carried thereby, a spacing frame interposed between the hub plates maintaining the latter in spaced relation, a tire, tire supporting plates confined between the spacing frame and hub plates, a plate having extended ends and secured to said hub, and reinforcing rods connecting one of the hub plates with the ends of the plate.

4. A wheel structure comprising a hub, hub flanges arranged on the hub, hub plates attached to the flanges and disposed in spaced relation, a spacing frame interposed between the hub plates and including a plurality of radiating plates, a tire, and tire supporting plates carried between portions of the spacing frame and hub plates and having portions thereof cut away to accommodate the radiating plates of the frame structure whereby non-rotatable connection between the latter and the tire supporting plates is afforded.

5. A wheel structure comprising a hub, hub plates carried thereby, a spacing frame interposed between the hub plates and including a plurality of radiating plates, means maintaining the plates in position against the opposed sides of the spacing frame, a tire, and tire supporting plates confined between the opposite sides of the spacing frame and the hub plates and having inwardly directed fingers confined between the radiating plates of the spacing frame whereby a non-rotatable connection between the latter and the tire supporting plates is established.

6. A wheel structure comprising a hub, flanges carried thereby, opposed hub plates having the medial portions depressed and connected with the flanges, a spacing frame interposed between the hub plates and concentrically spaced with relation to the hub, said spacing frame consisting of a centrally disposed ring and a plurality of spokes rigidly connected therewith and radiating therefrom, a tire, and recessed tire supporting plates confined between the opposed sides of the spacing frame and the hub plates.

7. A wheel structure comprising a hub, opposed hub plates carried thereby, a spacing frame interposed between the hub plates, a tire, and tire supporting plates confined between the spacing frame and the hub plates and having internal grooves formed adjacent their central edge adapted to receive packing whereby dust and dirt is excluded from the interior of the wheel structure.

8. A wheel structure comprising a hub, opposed hub plates carried thereby, a spacing frame interposed between the hub plates, a tire, tire supporting plates confined between the hub plates and the spacing frame, an angular plate carried by the terminal of the hub, and adjustable connections between the plate and the adjacent hub plate for bracing the latter.

In testimony whereof, I affix my signature hereto.

ADOLPH CLOSZ.